United States Patent
Piazzi

(10) Patent No.: US 9,433,321 B2
(45) Date of Patent: Sep. 6, 2016

(54) OVEN FOR GRILLING FOOD

(75) Inventor: Enrico Piazzi, Cremona (IT)

(73) Assignee: X-OVEN INVESTMENTS SA, Luxembourg (LU)

( * ) Notice: Subject to any disclaimer, the term of this patent is extended or adjusted under 35 U.S.C. 154(b) by 375 days.

(21) Appl. No.: 14/000,013

(22) PCT Filed: Mar. 2, 2012

(86) PCT No.: PCT/IT2012/000062
§ 371 (c)(1),
(2), (4) Date: Aug. 16, 2013

(87) PCT Pub. No.: WO2012/120553
PCT Pub. Date: Sep. 13, 2012

(65) Prior Publication Data
US 2013/0319256 A1 Dec. 5, 2013

(30) Foreign Application Priority Data
Mar. 4, 2011 (IT) .............................. CR2011A0004

(51) Int. Cl.
*A47J 37/07* (2006.01)
*A47J 39/00* (2006.01)
*A47J 37/06* (2006.01)

(52) U.S. Cl.
CPC ............. *A47J 37/07* (2013.01); *A47J 37/0694* (2013.01); *A47J 37/0704* (2013.01); *A47J 39/006* (2013.01)

(58) Field of Classification Search
CPC ..... A23B 4/052; A23B 4/044; A47J 39/006; A47J 37/06; A47J 37/067; A47J 37/0694

USPC ................. 99/400, 401, 393, 448, 450, 482; 126/273 R, 340, 243, 26, 25 A
See application file for complete search history.

(56) References Cited

U.S. PATENT DOCUMENTS

| | | | | |
|---|---|---|---|---|
| 238,031 A | * | 2/1881 | Deuel | 99/482 |
| 1,961,391 A | * | 6/1934 | Reedy et al. | 99/446 |
| 3,450,025 A | * | 6/1969 | Fleming | 99/399 |

(Continued)

FOREIGN PATENT DOCUMENTS

| CN | 201557492 | 8/2010 |
|---|---|---|
| JP | H10-61955 | 3/1998 |

(Continued)

OTHER PUBLICATIONS

International Search Report, dated May 10, 2012, from corresponding PCT application.

(Continued)

*Primary Examiner* — Reginald L Alexander
(74) *Attorney, Agent, or Firm* — Young & Thompson

(57) ABSTRACT

An oven for grilling food, is provided with: an outer shell (2), consisting of walls defining an internal volume, including a transparent portion (3); at least one door (4). The volume is subdivided into a zone (5) for heat production by heating elements and a cooking zone (6) including at least one grill (7) on which the food is placed. The at least one door (4) is associated with the at least one grill (7), which is slidingly supported inside the outer shell (2) and includes a bulkhead (8), opposite the door (4) with respect to the grill (7), arranged for closing the cooking zone (6) when the grill is fully extracted from the oven.

13 Claims, 2 Drawing Sheets

(56) References Cited

U.S. PATENT DOCUMENTS

| | | | |
|---|---|---|---|
| 3,644,124 A * | 2/1972 | Bedsole | 426/233 |
| 4,840,118 A | 6/1989 | Rinehart | |
| 5,481,964 A | 1/1996 | Kitten | |
| 5,960,782 A | 10/1999 | Clements et al. | |
| 7,021,200 B2 * | 4/2006 | Han et al. | 99/400 |
| 7,078,662 B2 * | 7/2006 | Yoshidome | 219/756 |
| 2005/0028803 A1 * | 2/2005 | Jiang | 126/25 A |
| 2006/0070532 A1 * | 4/2006 | Chang | 99/476 |
| 2007/0277800 A1 | 12/2007 | Chiang | |
| 2009/0320882 A1 | 12/2009 | Averwater | |

FOREIGN PATENT DOCUMENTS

| | | |
|---|---|---|
| JP | 2003-88476 | 3/2003 |
| JP | 2004-263899 | 9/2004 |
| JP | 31412343141235 | 5/2008 |
| JP | 2008-202900 | 9/2008 |

OTHER PUBLICATIONS

English translation of Chinese Office Action, dated Dec. 17, 2014, in corresponding Chinese Patent Application No. 201280010997.8.
JP Office Action, dated Dec. 15, 2015; Application No. 2013-555997.

* cited by examiner

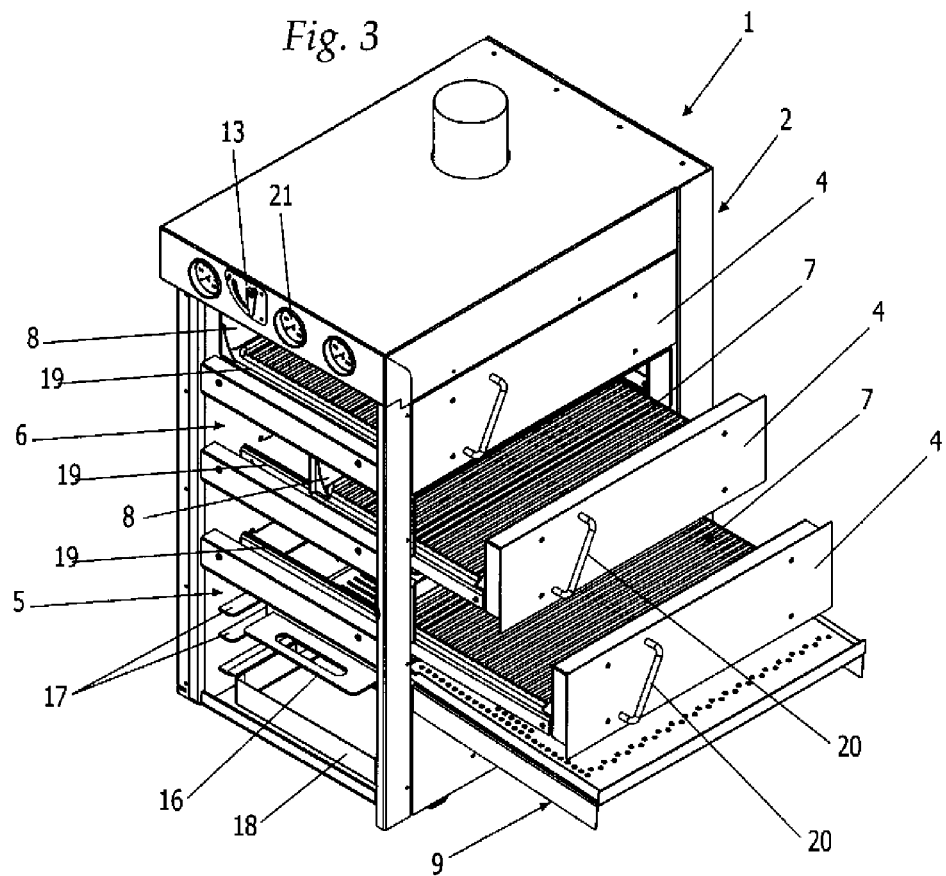
Fig. 3
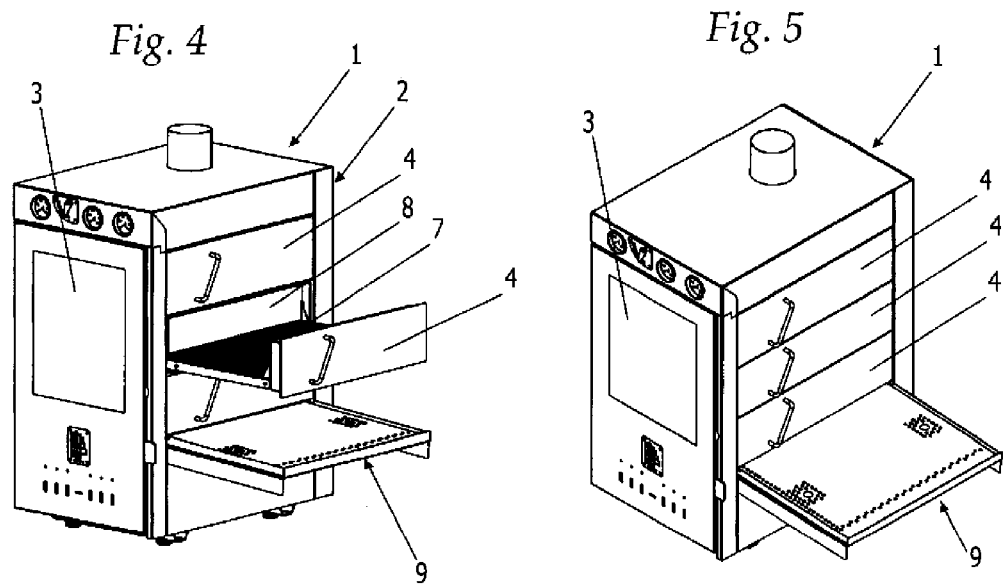
Fig. 4
Fig. 5

OVEN FOR GRILLING FOOD

This invention relates to the food preparation equipment sector.

More in detail, the invention relates to an oven for grilling food.

Ovens normally used in the food preparation field, either electric or powered by liquid or gas fuels, substantially comprise an outer shell, generally made of insulated aluminum or steel walls, enclosing an internal volume subdivided into a heat production zone and a food cooking zone.

The outer shell generally comprises a wall, at least partially transparent, and at least one door for opening said oven, which normally comprises said transparent portion and opens frontally, towards the operator.

The heat production zone comprises either an electric coil that heats up, or a plurality of nozzles emitting gas ignited by a spark, or other means for the combustion of other types of fuel.

The cooking zone is provided with one or more grills arranged vertically at different heights, on which the food can be placed directly.

Sometimes, for ovens provided with several grills, the door is not a single piece but is subdivided into individual doors, each hinged at the level of one of said grills.

Disadvantageously, each time the door is opened to insert the food or to check the degree of cooking, a large quantity of heat escapes from the oven and the temperature in the cooking zone drops drastically, compromising the successful preparation of the food. Furthermore, to return to the correct temperature, the oven requires a greater consumption of fuel and therefore greater expense.

The operator is also struck by the heat escaping from the oven, and grills removed from the oven drip cooking liquids directly onto the door or floor.

Furthermore, these types of ovens do not enable the use of fossil fuels, such as wood or coal for example, meaning that they cannot be used to barbecue.

Braziers are an alternative to said traditional ovens, especially to barbeque and therefore using fossil fuels.

Braziers are containers made of steel or cast iron formed of a surface on which the wood is placed, with specific holes allowing the ashes to fall into an underlying collecting tray. A grill for cooking foods is placed at a variable distance above the plane. This is the most common type of "barbecue" and can also be made of brickwork, closed on three sides, normally at the back and sides, to provide protection against the wind and from inevitable sparks from the hot coals.

Disadvantageously, for said braziers there is no front closure and therefore, in this case too, there is an enormous dispersion of heat.

Even more disadvantageously, several grills cannot be arranged vertically above one another, since the heat would not reach them uniformly.

Furthermore, the user is constantly struck by heat and smoke, making the work unpleasant and unhygienic.

This invention proposes to overcome this limits, by providing an oven for grilling food that does not waste heat, thus having a good efficiency, that does not strike the operator with heat or smoke and which recovers the cooking liquids when extracting the grills and moving the food.

Another aim of the invention is to provide an oven that is easy to use both in a domestic environment, and in a restaurant environment.

Further aim of the invention is to provide an oven that is practical, safe to use, fitted with adjustment and safety devices, suitable for use with solid, liquid or gaseous fuels or with electricity.

These aims are achieved by an oven for grilling food provided with:

an outer shell, consisting of walls defining an internal volume, comprising a transparent portion;

at least one door, wherein said volume is subdivided into a zone for heat production by means of heating means and a cooking zone comprising at least one grill on which said food is placed, characterized in that said at least one door is associated with said at least one grill, which is slidingly supported inside said outer shell and comprises a bulkhead, opposite said door with respect to said grill, arranged for closing said cooking zone when the grill is fully extracted from said oven.

According to a first embodiment of the invention, said at least one grill is slidingly associated with said outer shell by means of telescopic guides arranged for allowing the lateral exit thereof from the oven.

A further embodiment of the invention provides that said transparent portion belongs to a wall of said oven placed at the front, which can be opened for loading said fuel and cleaning operations.

According to a further embodiment of the invention, said oven comprises a drip tray positioned so as to be underneath said at least one grill when the latter is extracted from said oven. In particular, said drip tray comprises a perforated surface and an underlying draining tray for cooking liquids.

According to yet another embodiment of the invention, said oven comprises a smoke outlet conduit that connects said cooking zone with the outside environment, and said conduit is provided with a butterfly valve that is selectively operable by movement means accessible from the outside.

Furthermore, said shell comprises, in a position corresponding with said heat production zone, a ventilation grill for the introduction of combustion air, provided with a mobile shutter that determines the size of the openings thereof, selectively operable by further movement means accessible from the outside.

Advantageously, said heat production zone comprises a grill for supporting solid fuel, arranged for engaging support means placed at different heights with respect to said cooking zone above. Said heat production zone also comprises a tray for collecting the ash deriving from combustion.

In a further preferred embodiment of the invention, said oven comprises a food-warmer compartment positioned laterally and thermically connected with said heat production zone.

The invention has many advantages.

The bulkheads associated with each grill hermetically close the volume used for the cooking zone when the grill, during use, is completely extracted from the oven to check the cooking and preparation of food.

Advantageously, the internal volume of the oven always maintains a constant temperature, the foods are not subjected to sudden changes in temperature and therefore their cooking is optimal, and the operator is not struck by any blast of heat.

Even more advantageously, during use there is no heat loss towards the outside, thereby optimizing and reducing fuel consumption.

The grills, which are totally independent from one another including the door, allow different types and times of cooking. Advantageously, each grill is provided with a temperature control probe connected to display means placed on the outer shell.

The grills are slidingly resting on telescopic guides arranged for resisting high temperatures, but advantageously they are also interchangeable: indeed each item of food requires a particular grill with a specific geometry and spacing of the fissures.

The drip tray makes it possible to collect the cooking liquids coming from the foods when the grills are extracted from the oven, thereby always guaranteeing the cleanliness of the working zone.

The wheels the oven is provided with, associated with the outer shell, allow to move it. In the case of domestic use of said oven, the wheels are even more advantageous since they enable the oven to be moved outside the house as well for parties and gatherings.

The smoke outlet conduit ensures the perfect disposal of spent gases, but at the same time, thanks to the selectively operable butterfly valve associated therewith, it is possible to adjust said outlet to control the degree of flavoring and smoking of the foods being cooked.

On the other hand, the combustion air control shutter, placed on the outer shell in a position corresponding to the heat production zone, advantageously makes it possible to control the flame and fuel consumption, which also results in economic savings.

Whenever solid fuel is used, such as wood or coal for example, the supporting grill can advantageously be moved up or down with respect to the grills on which the food is resting: this makes it possible to position even greater quantities of fuel inside the heat production zone, thereby enabling the oven to be prepared earlier with a single operation, even for long cooking times. Furthermore, the heat source can be placed closer to or farther away from the food to be cooked according to the type of food and the corresponding cooking method.

On the bottom of the oven, below the heat production zone, there is a tray for collecting the ash deriving from combustion, so that no ash is deposited directly on the outer shell and cleaning operations are made easier.

Advantageously, accessory elements can be applied to said oven that make it even more functional, such as a food-warmer compartment for example, arranged for keeping cooked foods at the appropriate temperature, by indirectly exploiting the heat from the combustion zone.

The oven is made entirely of steel and is therefore easily cleaned.

The advantages of the invention shall appear more clearly from the following description of preferred embodiments, made by way of indicative and non-limiting examples, with reference to the figures, wherein:

FIGS. 1, 4 and 5 show an axonometric view of an oven for grilling food according to the invention, at different moments of use;

FIG. 3 shows a partially exploded axonometric view of the oven illustrated in FIG. 1.

Figure 1:
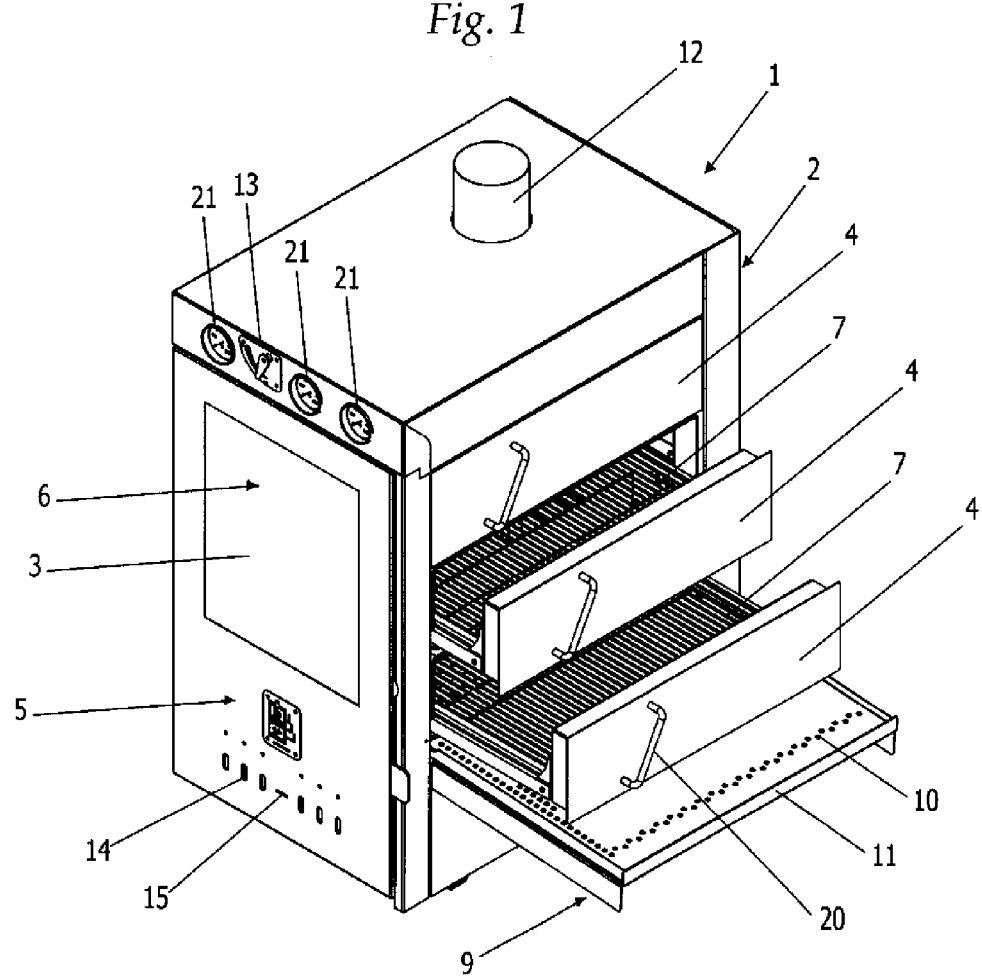

With reference to the Figures, an oven 1 for grilling food is shown, in particular an oven powered by solid fuel, such as wood or charcoal.

Said oven consists of an outer shell 2, consisting of steel walls, which defines an internal volume subdivided into a heat production zone 5 and a cooking zone 6.

On the front of said outer shell 2 there is a portion in transparent glass 3.

In correspondence with the position of said transparent portion 3, said outer shell 2 can be opened for cleaning operations and for preparing the oven for use.

The fuel to be burned is placed inside said heat production zone 5, while the food is arranged inside said cooking zone 6.

In particular, said heat production zone 5 comprises a grill 16 for supporting the solid fuel.

Said support grill 16 engages appropriate support means 17, guides or protrusions, placed at different heights with respect to said cooking zone 6 above.

Said heat production zone 5 further comprises a tray 18 for collecting the ash deriving from combustion, arranged below said support grill 16.

Said outer shell 2 further comprises, in a position corresponding to said heat production zone 5, a ventilation grill 14 for the introduction of combustion air into the oven.

Said ventilation grill 14 is provided with a mobile shutter that determines the size of the openings thereof, selectively operable by movement means 15 provided on said outer shell 2 and therefore accessible from the outside.

Inside said food cooking zone 6 a plurality of grills 7 are provided, above one another, upon which the food can be directly placed.

Figure 2:
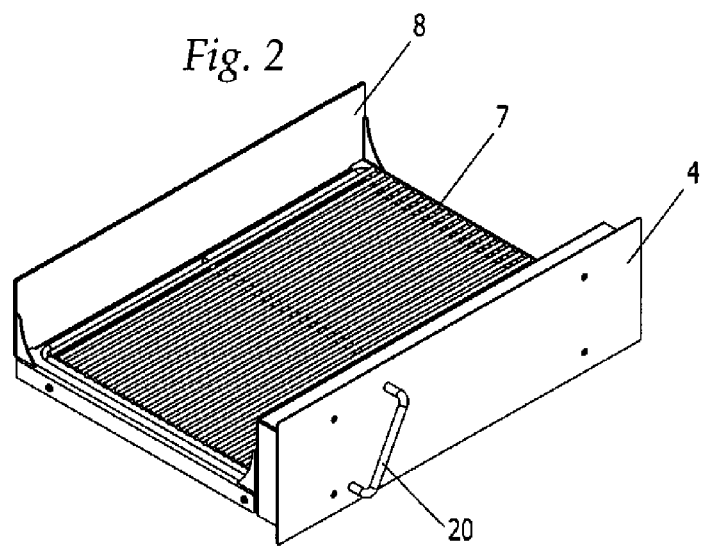
FIG. 2 shows an axonometric view of a detail of the oven illustrated in FIG. 1.

Each grill 7 can slide on specific telescopic guides 19, and is associated on one side with a door 4 made in said outer shell 2 and on the other side with a bulkhead 8, as shown in particular in FIG. 2.

The telescopic guides 19 allow the grills 7 to exit laterally from the oven.

Each door 4 is totally independent and is provided with a handle 20 to enable the operator to open it.

Each bulkhead 8 is arranged for closing said cooking zone 6 when the corresponding door 4 is open and the corresponding grill 7 is fully outside said oven 1.

Each grill 7 is provided with a probe, arranged for measuring the surrounding temperature, which can then be displayed on specific thermometers 21 provided on the outer shell 2.

Said oven 1 comprises a drip tray 9 positioned on one side so that it underlies each grill 7 when the latter is outside the oven.

Said drip tray 9 comprises a perforated surface 10 and a draining tray 11 for the cooking liquids falling from the grills 7 above.

Said oven 1 comprises a smoke outlet conduit 12, made in said outer shell 2, arranged for connecting said cooking zone 6 with the outside environment in order to let the gases released by the burnt fuel out.

Said conduit 12 is provided with a butterfly valve that is selectively operable by movement means 13, provided on said outer shell 2 and therefore accessible from the outside. Said movement means 13 comprise a lever that opens or closes, fully or partially, said butterfly valve so as to adjust the quantity of smoke leaving said conduit 12 and the degree of flavoring and smoking, typical of barbeque, of the food inside the oven 1.

According to embodiments not illustrated, said oven may comprise a plurality of wheels arranged for enabling the movement thereof, and a food-warmer compartment positioned to the side, below the drip tray, thermally connected with said heat production zone 5.

Use of the oven 1 for grilling food according to the invention is described below.

The user loads the oven 1 with fuel, for example wood, by momentarily opening the front wall provided with the transparent portion 3 and arranging the wood onto the grill 16 provided in the heat production zone 5.

Once the wall has been closed again and combustion started, the user opens each door 4 one by one and places the food to be cooked on the respective grills 7, choosing the position of the grill to load according to the need for cooking heat of the various foods.

During the food arrangement phase and subsequent checking phases, the volume inside the oven 1 maintains a constant temperature and the heat does not escape thanks to the individual bulkheads 8 that hermetically close the cooking zone 6 when the grills are totally extracted.

Advantageously, the user can operate in front of the transparent portion 3 with a clear view of the inside of the oven 1, and can open the doors 4 laterally without being struck by the heat.

The invention, as described and illustrated, achieves the set objectives and aims.

Naturally, the construction details, materials, dimensions, thicknesses and embodiments may vary considerably with respect to what has been described and illustrated, without however departing from the scope of the present invention, as described, illustrated and claimed.

The invention claimed is:

1. An oven (1) for grilling food, comprising:
    an outer shell (2) with walls defining an internal volume, the outer shell having a transparent portion (3); and
    at least one door (4),
    wherein said volume is subdivided into a zone (5) for heat production and a cooking zone (6) comprising at least one grill (7) on which said food is placed,
    wherein said at least one door (4) is associated with said at least one grill (7), which is slidingly supported inside said outer shell (2) and comprises a bulkhead (8), opposite said door (4) with respect to said grill (7), arranged for closing said cooking zone (6) when said at least one grill is fully extracted from said oven, and
    wherein said outer shell comprises a front panel that opens to expose the lower heat production zone and the upper cooking zone, and wherein said transparent portion (3) is part of said front panel, and wherein said at least one grill is visible through said transparent portion.

2. The oven (1) according to claim 1, wherein said at least one grill (7) is slidingly associated with said outer shell (2) by means of telescopic guides (19) arranged for allowing lateral exit thereof from the oven (1).

3. The oven (1) according to claim 1, further comprising a drip tray (9) positioned so as to be underneath said at least one grill (7) when said at least one grill is extracted from said oven.

4. The oven (1) according to claim 3, wherein said drip tray (9) comprises a perforated surface (10) and an underlying draining tray (11) for cooking liquids.

5. The oven (1) according to claim 1, further comprising a smoke outlet conduit (12) that connects said cooking zone (6) with the outside environment.

6. The oven (1) according to claim 1, wherein said outer shell (2) comprises, in a position corresponding with said heat production zone (5), a ventilation grill (14) for introduction of combustion air, provided with a mobile shutter that determines a size of openings thereof, selectively operable from the outside.

7. The oven (1) according to claim 1, wherein said heat production zone (5) comprises a grill (16) for supporting solid fuel arranged for engaging supporting means (17) placed at different heights with respect to said cooking zone above.

8. The oven (1) according to claim 1, wherein said heat production zone (5) comprises a tray (18) for collecting ash deriving from combustion.

9. An oven for grilling food, comprising:
    an outer shell with walls defining an internal volume, the internal volume being divided into a lower heat production zone and an upper cooking zone;
    one of said walls having plural doors that are each associated with a respective one of plural grill trays that are in the upper cooking zone, each of the plural doors being mounted to open and slide the respective one of the plural grill trays outside the internal volume, each of the plural grill trays having a bulkhead that closes an opening made by the respective one of the plural doors when opened;
    a second of said walls adjacent to said one wall including a front panel that opens, wherein when the front panel is open, both the lower heat production zone and the upper cooking zone are exposed to outside the oven; and
    the front panel having a transparent glass portion through which all of the plural grill trays in the upper cooking zone are visible.

10. The oven according to claim 9, further comprising a drip tray in the internal volume beneath a lowest one of said plural grill trays and above the heat production zone, said drip tray being movable to outside the internal volume through an opening in said one wall.

11. The oven according to claim 9, wherein said front panel includes ventilation openings through which air reaches the lower heat production zone, said ventilation openings having a mobile shutter that determines a size of the ventilation openings.

12. The oven according to claim 9, further comprising a smoke outlet conduit that connects the upper cooking zone to outside the oven, and a control switch on the second wall, spaced from said front panel, that opens and closes the smoke outlet conduit.

13. The oven according to claim 12, further comprising a temperature gauge on the second wall adjacent to the control switch and spaced from the front panel.

* * * * *